United States Patent
Fahringer et al.

(10) Patent No.: US 6,877,481 B2
(45) Date of Patent: Apr. 12, 2005

(54) MULTI-CYLINDER STATIONARY INTERNAL COMBUSTION ENGINE

(75) Inventors: Albert Fahringer, Kössen (AT); Peter Skorjanz, Paudorf (AT)

(73) Assignee: Jenbacher Aktiengesellschaft, Jenbach (AT)

(*) Notice: Subject to any disclaimer, the term of this patent is extended or adjusted under 35 U.S.C. 154(b) by 114 days.

(21) Appl. No.: 10/211,189

(22) Filed: Aug. 2, 2002

(65) Prior Publication Data
US 2003/0024503 A1 Feb. 6, 2003

(30) Foreign Application Priority Data
Aug. 3, 2001 (AT) .................................. A 1212/2001

(51) Int. Cl.$^7$ ............................................. F02D 41/00
(52) U.S. Cl. ..................... 123/339.16; 123/339.17; 123/339.18; 123/339.19; 290/40 A; 290/40 B; 290/40 C; 290/40 R
(58) Field of Search ................... 123/339.16, 339.17, 123/339.18, 339.19; 290/40 A, 40 B, 40 C, 40 R

(56) References Cited

U.S. PATENT DOCUMENTS

| | | | | |
|---|---|---|---|---|
| 5,180,923 A | * | 1/1993 | Tyler | 290/40 C |
| 5,252,860 A | * | 10/1993 | McCarty et al. | 290/40 R |
| 5,703,410 A | * | 12/1997 | Maekawa | 290/40 C |
| 5,748,500 A | * | 5/1998 | Quentin et al. | 702/182 |
| 6,552,439 B2 | * | 4/2003 | Dunsworth et al. | 290/41 |
| 2002/0113439 A1 | * | 8/2002 | Thomas et al. | 290/40 A |

FOREIGN PATENT DOCUMENTS

EP    1 022 450 A2    7/2000

* cited by examiner

Primary Examiner—Henry C. Yuen
Assistant Examiner—Johnny H. Hoang
(74) Attorney, Agent, or Firm—Lorusso Loud & Kelly LLP

(57) ABSTRACT

Multi-cylinder stationary internal combustion engine (1)—in particular a gas otto engine—with at least one throttle valve (13) and with at least one compressor (15)—in particular turbo-supercharger—for driving at least one generator (3) for the production of electric current or for driving at least one other consumer of mechanical energy, the internal combustion engine (1) containing a regulator (10) which, for the shedding of load, sets the throttle valve (13) to a permissible minimum-closure position which differs from the completely closed position and disconnects at least one cylinder (9) in order to prevent overspeed.

15 Claims, 3 Drawing Sheets

MULTI-CYLINDER STATIONARY INTERNAL COMBUSTION ENGINE

BACKGROUND OF THE INVENTION

The invention relates to a multi-cylinder stationary internal combustion engine—in particular a gas otto engine—with at least one throttle valve and with at least one compressor—in particular turbo-supercharger—for driving at least one generator for the production of electric current or for driving another consumer of mechanical energy.

Internal combustion engines according to the preamble are used both for the supply of individual local power consumers in so-called isolated operation and for the supply of power into the public system. The speed of the internal combustion engines is stabilized via an output regulator as long as the generator which is driven by the internal combustion engine is connected to the public system. If the generator is separated from the public system or if in isolated operation major power consumers are suddenly cut off, there is a sudden drop in load at the generator. The same applies to the uncoupling of the internal combustion engine from the generator or other sudden changes in operating conditions. In order to prevent an acceleration of the speed of the internal combustion engine, and thus negative effects on, or the destruction of, the latter in the event of such a drop in load, the throttle valve is completely closed for a brief period in the state of the art. As a consequence, because the compressor or turbo-supercharger is still operating at a high output level, so-called compressor or turbo-supercharger pumping occurs if the compressor is throttled in a working point with lots of throughput on the output side. This in turn leads to the danger of explosions in the exhaust pipe. This process of turbo-supercharger pumping—once started—is completely uncontrollable and leads in most cases to the complete loss of the supercharging pressure followed by the stopping of the internal combustion engine.

In order to improve the reaction to removal of the load in internal combustion engines, in particular gas otto engines, and prevent so-called compressor or turbo-supercharger pumping, it is already known to fit a blow-off valve downstream of the compressor in order to be able to reduce the supercharging pressure without turbo-supercharger pumping in the event of a brief shedding of load. However, these procedures known in the state of the art have the disadvantage that they require additional components such as e.g. blow-off valves and the regulator needed for these. Furthermore, a combustible fuel/air mixture is released by the blow-off valve, which in turn creates the need for safe handling of the blown-off fuel/air mixture and thus an additional outlay.

SUMMARY OF THE INVENTION

The object of the invention is thus to provide an internal combustion engine of the type named at the outset in which the reaction to the shedding of load is improved in a structurally simple manner while avoiding the disadvantages named above.

This is achieved according to the invention in that the internal combustion engine contains a regulator which, for the shedding of load, sets the throttle valve to a permissible minimum-closure position which differs from the completely closed position and disconnects at least one cylinder in order to prevent overspeed.

Thus it is provided according to the invention that the regulator does not completely close the throttle valve, but sets it into a minimum-closure position permissible for operation, which leaves a certain residual opening. The unintentional occurrence of compressor or turbo-supercharger pumping is thereby effectively prevented. In order to prevent an overspeed of the internal combustion engine during this measure, it is also provided that one or more cylinders are disconnected. Through this combined measure governed by the regulator, a shedding of load becomes possible while avoiding unwanted compressor or turbo-supercharger pumping, additional components such as e.g. blow-off valves or the like not being needed. The regulator according to the invention thus represents a structurally simple, but very effective way of ensuring a controlled shedding of load.

It is further provided in a favourable variant that the regulator preferably disconnects the cylinders that are to be disconnected individually one after another and/or the maximum number of cylinders to be disconnected is limited. By limiting the number of cylinders to be disconnected, it is ensured that there is no pure unburned gas/air mixture in the exhaust pipe when all the cylinders are disconnected and unintentional explosions are thus prevented. The possibility of disconnecting the cylinders individually or in groups one after another makes possible a very good matching of cylinder disconnection to the momentary state of the internal combustion engine during a shedding of load.

In a favourable further development it is provided that the internal combustion engine has a device for calculating the position of the throttle valve, which calculates the permissible minimum-closure position to be set by the regulator according to at least one parameter defining the state of the internal combustion engine and/or of the generator. The permissible minimum-closure position represents a lower limit to the closure position of the throttle valve, above which the regulator can freely adjust the throttle valve. In all adjustment processes, the throttle valve must not however be closed beyond the permissible minimum-closure position.

As regards the parameters defining the state of the internal combustion engine that are used to calculate the permissible minimum-closure position, there are various possibilities in principle. Favourable variants provide that the internal combustion engine contains at least one measuring device for measuring the speed of the compressor preferably turbo-supercharger and/or the instantaneous supercharging pressure behind the compressor and/or the instantaneous speed of the internal combustion engine, the device for calculating the position of the throttle valve calculating the minimum-closure position according to the speed of the compressor and/or the instantaneous supercharging pressure behind the compressor and/or the instantaneous speed of the internal combustion engine.

A very accurate but simple possibility provides that the internal combustion engine contains at least one measuring device for measuring the instantaneous output of the internal combustion engine, the device for calculating the position of the throttle valve calculating the minimum-closure position according to the measured output of the internal combustion engine.

To fix the number of cylinders that are to be disconnected in order to avoid overspeed, a favourable variant provides that the internal combustion engine contains a device for calculating the number of cylinders, which calculates the number of cylinders that are to be disconnected by the regulator according to at least one parameter defining the state of the internal combustion engine and/or the generator. In each case there are again different state-defining parameters which can be used as a basis of calculation for the disconnection of cylinders. Favourable variants provide that the internal combustion engine contains at least one measuring device for measuring the speed of the compressor preferably turbo-supercharger and/or the instantaneous output of the internal combustion engine and/or the instantaneous supercharging pressure behind the compressor and/or the instantaneous speed of the internal combustion engine, the device for calculating the number of cylinders calculating the number of cylinders that are to be disconnected in order to prevent overspeed according to the speed of the compressor and/or the instantaneous output of the internal combustion engine and/or the instantaneous supercharging pressure behind the compressor and/or the instantaneous speed of the internal combustion engine.

With a view to ensuring that overspeed is avoided, and that adjustment is rapid and accurate, it is particularly favourable that the internal combustion engine contains at least one measuring device for measuring the instantaneous speed of the internal combustion engine, the device for calculating the number of cylinders calculating the number of cylinders that are to be disconnected in order to prevent overspeed according to the measured speed of the internal combustion engine. It is provided that, starting with a specific engine speed, the number of cylinders to be disconnected is calculated in proportion to the overspeed.

In normal operation, the permissible position of the throttle valve is calculated in state-related manner by the engine regulator and limited downwards by the permissible minimum setting. In the case of a rapid shedding of load, it is provided to set the throttle valve to the calculated minimal position as quickly as possible.

With regard to the recognition of sheddings of load by the regulator, a basic variant provides that the regulator, where there are pre-settable fluctuations in the speed of the internal combustion engine, sets the throttle valve to a minimum-closure position and disconnects at least one cylinder in order to prevent overspeed. However, to recognize a shedding of load in the case of internal combustion engines with at least one generator switch connecting the generator to a local power supply system and/or with at least one mains switch connecting the generator to a public power supply system, it can be provided that the respective positions of the generator switch or mains switch are also made available as an adjustment value of the regulator for the recognition of a shedding of load. With these variants it is thus provided that the regulator, in the case of pre-settable fluctuations in the speed of the internal combustion engine and/or changes in the position of the generator switch and/or of the mains switch, sets the throttle valve to a minimum-closure position and disconnects at least one cylinder in order to prevent overspeed.

Once the shedding of load has taken place, it is provided that the regulator, after the shedding of load, preferably reconnects the disconnected cylinders individually one after another, according to at least one parameter defining the state of the internal combustion engine or the generator, the throttle valve preferably remaining set in minimum-closure position while the cylinders are connected. A favourable variant provides in turn that the regulator reconnects the disconnected cylinders according to the speed of the internal combustion engine.

BRIEF DESCRIPTION OF THE DRAWING

Further features and details of the present invention result from the following description of the figures. These show.

DETAILED DESCRIPTION OF THE INVENTION

Figure 1:
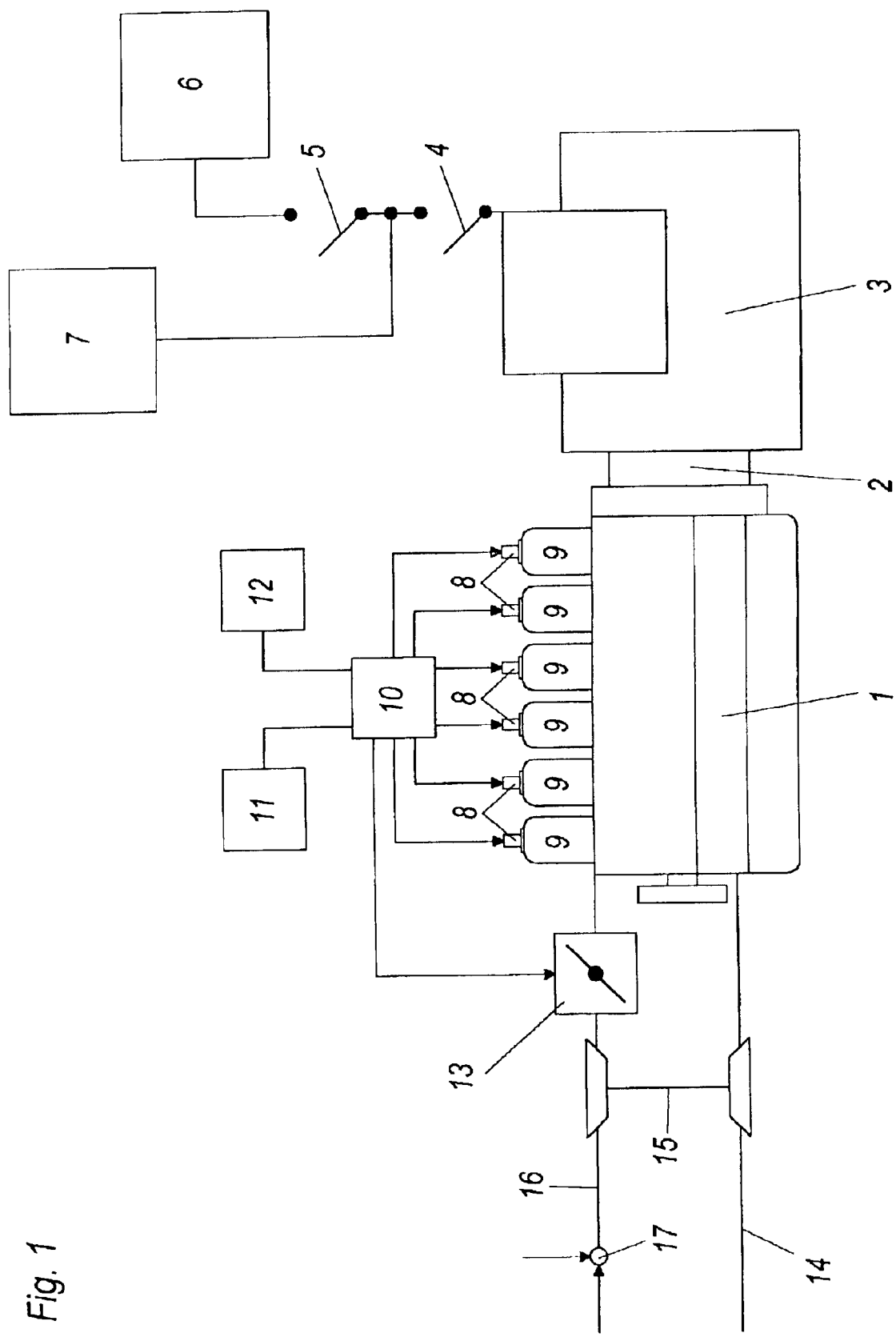
FIG. 1 a schematic representation of an internal combustion engine according to the invention FIG. 2 a schematic representation of the chronology of the regulation process according to the invention and FIG. 3 a regulation diagram.

In FIG. 1 an internal combustion engine 1, in the present example a gas otto engine, drives a generator 3 via a clutch coupling 2. It is provided in the example shown that this generator 3 supplies both a public supply system 6 and also a local system 7 or local consumers with power. The generator switch 4 is located in the feed line to the local system 7, and in the line to the public system 6 there is in addition a mains switch 5. If the mains switch 5 and the generator switch 4 are closed, the output of the internal combustion engine 1 is controlled via the public supply system 6. If the mains switch 5 is open and the generator switch 4 is closed, the arrangement comprising generator 3 and internal combustion engine 1 operates in so-called isolated operation with a speed control of the internal combustion engine. As a rule marked fluctuations in the output levels demanded of the generator can occur. A shedding of load occurs whenever the output demanded of the generator is suddenly reduced. This can happen e.g. through the opening of the mains switch 5 or of the generator switch 4, but also through the opening of the clutch coupling 2. Moreover, a shedding of load at the internal combustion engine is also necessary in isolated operation if a dominant local consumer in the local system 7 is suddenly disconnected. In principle it is provided that the regulator 10 monitors, via sensors and lines not shown further here, whether the output demanded of the internal combustion engine is increasing or decreasing.

The internal combustion engine 1 has several cylinders 9 each with allocated firing mechanisms 8. The firing mechanisms 8 are controlled by the regulator 10. In addition, the regulator 10 is connected via a line to the throttle valve 13, via which both signals relating to the momentary position of the throttle valve and regulating signals for setting the position of the throttle valve are transmitted. The regulator 10 is additionally connected to a throttle valve calculation device 11 and to a device 12 for calculating the number of cylinders.

The fuel/gas mixture is mixed in the mixer 17 and conducted via the feed line 16 to the supply side of the compressor 15 preferably a turbo-supercharger. The compressor 15 compresses the fuel/air mixture before the throttle valve 13, the compressed fuel/air mixture being fed to the cylinders 9 of the internal combustion engine 1 via the throttle valve 13. The drive turbine of the compressor 15 is located in the exhaust line 14, as known in the state of the art.

Figure 2:
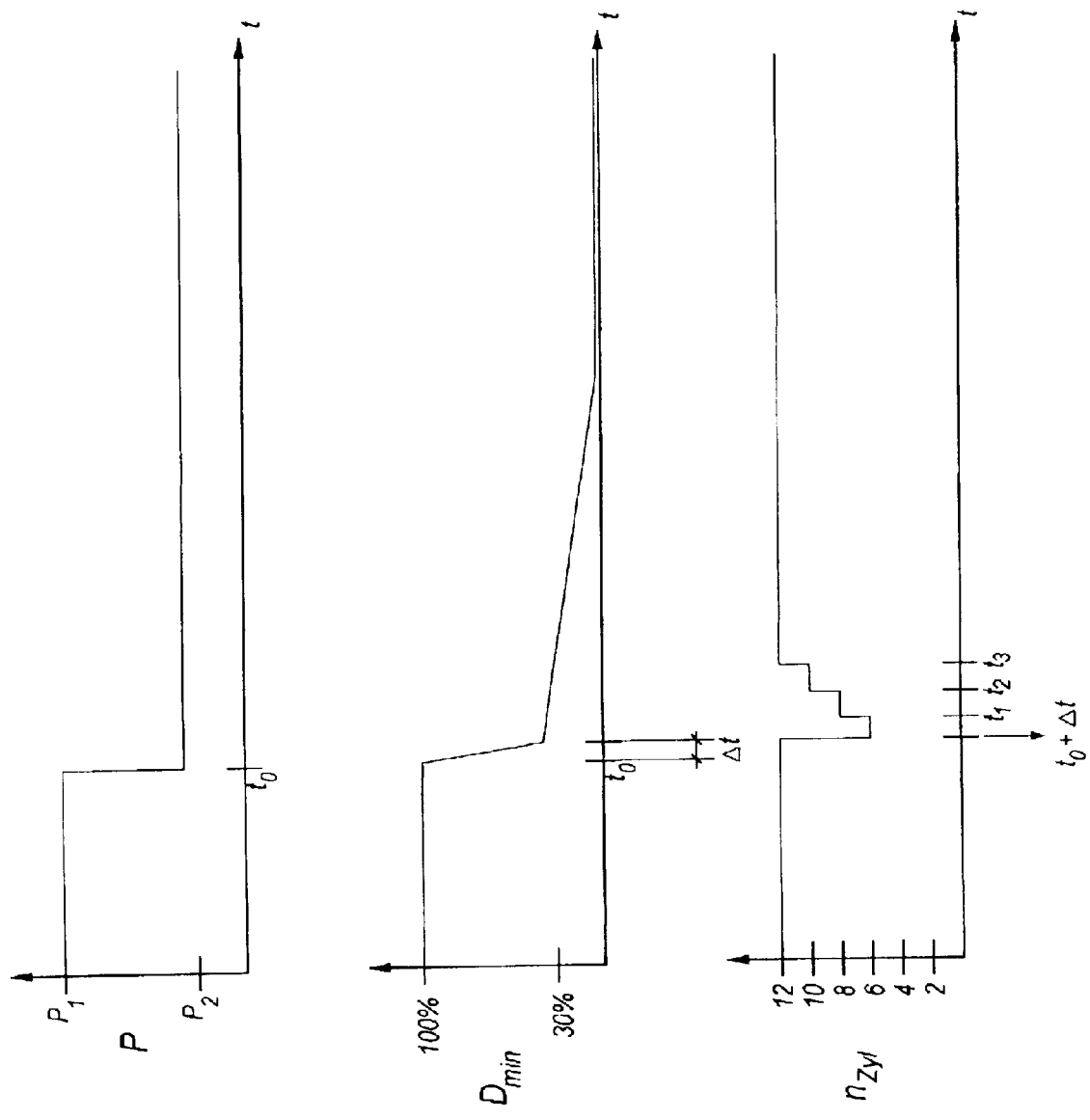
Figure 3:
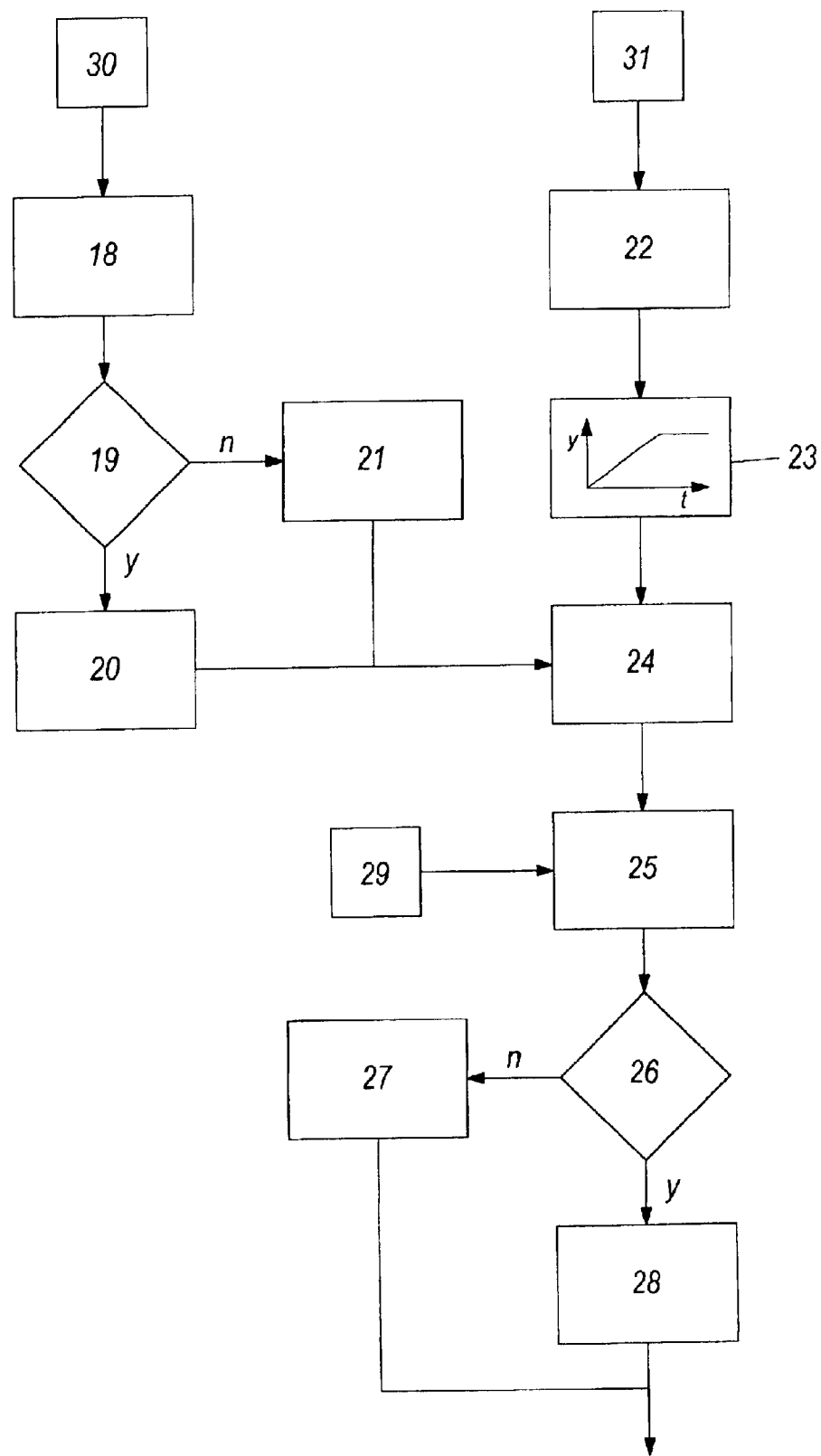

As is shown in more detail in FIGS. 2 and 3, the regulator 10 monitors, via signal lines not shown further in FIG. 1, the position of the switches 4 and 5, of the clutch coupling 2 as well as the speed of the internal combustion engine 1 in order to recognize a shedding of load. The throttle valve calculation device 11 constantly calculates for the regulator 10, according to at least one parameter defining the state of the internal combustion engine, a minimum setting for the throttle valve that is permissible in the instantaneous state of the engine, below which it is not allowed to fall. These parameters defining the state of the internal combustion engine 1 are made available to the device 11 calculating the position of the throttle valve, via measuring devices and signal lines that are not shown further here. Proposed as possible state-defining parameters for the calculation of the minimum-closure position of the throttle valve are the speed of the compressor 15 and/or the instantaneous output of the internal combustion engine and/or the instantaneous supercharging pressure behind the compressor and/or the instantaneous speed of the internal combustion engine. If a shedding of load is detected by the regulator 10, the latter sets the permissible minimum-closure position of the throttle valve calculated by the throttle valve calculation device 11.

The device 12 for calculating the number of cylinders likewise monitors, via signal lines and sensors likewise not shown here but known in the state of the art, the speed of the compressor 15 and/or the instantaneous engine output of the internal combustion engine and/or the instantaneous supercharging pressure behind the compressor 15 and/or the instantaneous speed of the internal combustion engine 1, in order to calculate from same the necessary number of cylinders to be disconnected in order to prevent an overspeed. The values calculated by the device 11 for calculating the position of the throttle valve and the device 12 for calculating the number of cylinders are made available to the regulator 10. The regulator 10 sets the calculated permissible minimum closure and disconnects, preferably when the permissible minimum-closure position of the throttle valve 13 is reached, the calculated number of cylinders 9 of the internal combustion engine 1. The disconnection can take place individually or in groups one after another. The disconnection of the cylinders 9 more favourably takes place via the disconnection of the firing mechanism 8 allocated to each cylinder 9. In principle, however, other variants known in the state of the art for the disconnection of cylinders can also be used here. Because the closure of the throttle valve 13 is incomplete, a compressor or turbo-supercharger pumping is avoided when the shedding of load takes place. To prevent overspeed, according to the invention one or more cylinders 9 are disconnected to this end. The device 11 for calculating the position of the throttle valve and the device 12 for calculating the number of cylinders can, contrary to the representation selected in FIG. 1, also be included in the regulator 10.

FIG. 2 shows a schematically represented shedding of load as well as the chronology t of the adjustments carried out by the regulator 10 of the power P demanded of the generator 3, the permissible minimum-closure position $D_{min}$ of the throttle valve 13 (given as relative aperture) and the number $n_{cyl}$ of cylinders 9 momentarily in operation. Before the shedding of load at time $t_0$ the load $P_1$ is taken off from the generator 3. At time $t_o$ of the shedding of load the power P drops from $P_1$ to $P_2$. This shedding of load can be caused e.g. by the opening of the generator switch 4 or of the mains switch 5 or by opening of the clutch coupling 2 or by a disconnection of a local consumer in the local power supply system 7. As a reaction to this shedding of load, the minimum-closure position of the throttle valve 13 calculated by the device 11 for calculating the position of the throttle valve on the basis of one or more of the above-named parameters defining the state of the internal combustion engine 1 is set by the regulator 10. In the example shown in FIG. 2 the regulator 10 sets the throttle valve set at 100% opening before the shedding of load at time $t_o$ to a permissible minimum-closure position of 30% opening. The permissible minimum-closure position is corrected by the device calculating the position of the throttle valve as a consequence of the change in the state of the engine. To prevent overspeed, according to the invention at time $t_{o+\Delta}t$ the number of cylinders 9 calculated by the device for calculating the number of cylinders according to one or more above-named variables defining the state of the internal combustion engine 1 is disconnected. In the example shown in FIG. 2 the regulator 10 reduces the number $n_{cyl}$ of actively operating cylinders from 12 to 6. After the shedding of load and the associated disconnection of six cylinders at time $t_o$ in the example shown two cylinders each are reconnected at times $t_1$, $t_2$ and $t_3$, preferably according to the momentary speed of the internal combustion engine until finally the full count of cylinders 9 of the internal combustion engine 1 is again operating. In principle there again takes place after the shedding of load at time $t_o$ a matching of the position of the throttle valve and of the number of actively operating cylinders $n_{cyl}$ to the newly-set operating state of the engine, so that the example represented in FIG. 2 shows only one of many possibilities of operation after the shedding of load at time $t_o$. In the example shown in FIG. 2 the pressure behind the turbo-supercharger and before the throttle valve drops after the shedding of load to the extent that $D_{min}$ falls further. However, this does not mean that the throttle valve is automatically closed again, as $D_{min}$ is only the permissible lower limit for the closure of the throttle valve by the regulator. Once the shedding of load has taken place, the regulator further adjusts the position of the throttle valve according to the adjustment criteria that are customary during normal operation, $D_{min}$ merely serving as a lower limit.

FIG. 3 shows schematically a possible course of the regulation process according to the invention. First, at position 18 the number of cylinders to be disconnected is calculated by the device 12 for calculating the number of cylinders according to at least one parameter 30 defining the state of the internal combustion engine 1. Then there is a switch in position 19 to position 21 and the throttle valve is thus released if there is to be no disconnection of cylinders or a switch to position 20, the throttle valve being held in the permissible minimum-closure position if the calculated number of cylinders to be disconnected is greater than 0. In position 22, the permissible throttle valve opening for the stationary state is preset according to the state-defining parameters 31. In position 23, a deceleration ramp is calculated for intermittent operating states according to these parameters for the permissible minimum position of the throttle valve. Both previously treated lines meet at point 24, the limits of the throttle valve thus being preset here. In point 25 there then takes place the calculation of the closure position of the throttle valve 13 according to the input parameters from point 24 and input parameters 29. These input parameters 29 can be the speed of the engine, the demanded electrical energy as well as the manner of operation of the internal combustion engine. After the calculation of the position of the throttle valve in point 25, it is decided in point 26, according to the calculated number of cylinders to be disconnected and the question of whether the throttle valve 13 is set to the permissible minimum position, whether the calculated number of cylinders is disconnected or not. If the condition is not satisfied then no cylinder is disconnected in position 27, if the condition is satisfied in position 26 then the calculated number of cylinders is disconnected in point 28.

What is claimed is:

1. Multi-cylinder stationary internal combustion engine comprising at least one compressor and at least one throttle valve arranged in a feed line which connects the compressor and the cylinders, the internal combustion engine being arranged for driving at least one generator for the production of electric current or for driving at least one other consumer of mechanical energy, wherein the internal combustion engine further comprises a regulator which, for the shedding of load, sets the throttle valve to a permissible minimum-closure position which differs from the completely closed position and disconnects at least one cylinder in order to prevent overspeed.

2. Internal combustion engine according to claim 1 further comprising a device for calculating the position of the throttle valve, which calculates the permissible minimum-closure position to be set by the regulator according to at least one parameter defining the state at least of the internal combustion engine or of the generator.

3. Internal combustion engine according to claim 2 further comprising at least one measuring device for measuring the speed of the compressor or the instantaneous supercharging pressure behind the compressor or the instantaneous speed of the internal combustion engine, wherein the device for calculating the position of the throttle valve calculates the permissible minimum-closure position according to the speed of the compressor or the instantaneous supercharging pressure behind the compressor or the instantaneous speed of the internal combustion engine.

4. Internal combustion engine according to claim 2 further comprising at least one measuring device for measuring the instantaneous output of the internal combustion engine, wherein the device for calculating the position of the throttle valve calculates the permissible minimum-closure position according to the measured output of the internal combustion engine.

5. Internal combustion engine according to claim 1 further comprising a device for calculating the number of cylinders, which calculates the number of cylinders to be disconnected by the regulator according to at least one parameter defining the state at least of the internal combustion engine or of the generator.

6. Internal combustion engine according to claim 5 further comprising at least one measuring device for measuring at least the speed of the compressor or the instantaneous output of the internal combustion engine or the instantaneous supercharging pressure behind the compressor or the instantaneous speed of the internal combustion engine, wherein the device for calculating the number of cylinders calculates the number of cylinders to be disconnected for the prevention of overspeed according to the speed of the compressor or the instantaneous output of the internal combustion engine or the instantaneous supercharging pressure behind the compressor or the instantaneous speed of the internal combustion engine or a combination of these parameters.

7. Internal combustion engine according to claim 5 further comprising at least one measuring device for measuring the instantaneous speed of the internal combustion engine, wherein the device for calculating the number of cylinders calculates the number of cylinders to be disconnected for the prevention of overspeed according to the measured speed of the internal combustion engine.

8. Internal combustion engine according to claim 1, wherein the maximum number of cylinders to be disconnected is limited.

9. Internal combustion engine according to claim 1, wherein the regulator preferably disconnects the cylinders to be disconnected one after another.

10. Internal combustion engine according to claim 1 further comprising at least one generator switch connecting the generator to a local power supply system or with at least one mains switch connecting the generator to a public mains supply or with both switches, wherein the regulator, at least in the case of pre-settable fluctuations in the speed of the internal combustion engine or changes in the position of the generator switch or of the mains switch, sets the throttle valve to a minimum-closure position and disconnects at least one cylinder in order to prevent overspeed.

11. Internal combustion engine according to claim 1, wherein the regulator, in the case of pre-settable fluctuations in the speed of the internal combustion engine, sets the throttle valve to a minimum-closure position and disconnects at least one cylinder in order to prevent overspeed.

12. Internal combustion engine according to claim 1, wherein the regulator, after the shedding of load, preferably reconnects the disconnected cylinders individually one after another, according to at least one parameter defining the state of the internal combustion engine or of the generator, the throttle valve preferably remaining set in minimum-closure position during the connection of cylinders.

13. Internal combustion engine according to claim 12, wherein the regulator reconnects the disconnected cylinders according to the speed of the internal combustion engine.

14. Internal combustion engine according to claim 1, wherein the engine is a gas otto engine.

15. Internal combustion engine according to claim 1, wherein the compressor is a turbo-supercharger.

* * * * *